(12) United States Patent
Gu et al.

(10) Patent No.: US 9,779,195 B2
(45) Date of Patent: Oct. 3, 2017

(54) MODEL-BASED RETIMING WITH FUNCTIONAL EQUIVALENCE CONSTRAINTS

(71) Applicant: The MathWorks, Inc., Natick, MA (US)

(72) Inventors: Yongfeng Gu, Brookline, MA (US); Girish Venkataramani, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 0 days.

(21) Appl. No.: 14/640,239

(22) Filed: Mar. 6, 2015

(65) Prior Publication Data

US 2015/0178418 A1 Jun. 25, 2015

Related U.S. Application Data

(63) Continuation-in-part of application No. 14/096,333, filed on Dec. 4, 2013, now Pat. No. 8,990,739.

(60) Provisional application No. 61/733,255, filed on Dec. 4, 2012, provisional application No. 61/787,445, filed on Mar. 15, 2013.

(51) Int. Cl.
*G06F 17/50* (2006.01)

(52) U.S. Cl.
CPC .......... *G06F 17/505* (2013.01); *G06F 17/504* (2013.01); *G06F 17/5022* (2013.01); *G06F 17/5081* (2013.01)

(58) Field of Classification Search
CPC .. G06F 17/505; G06F 17/5022; G06F 17/504; G06F 17/5081

USPC ............................ 716/107, 105, 136; 703/16
See application file for complete search history.

(56) References Cited

U.S. PATENT DOCUMENTS

| | | | |
|---|---|---|---|
| 4,748,439 A | 5/1988 | Robinson et al. | |
| 5,313,615 A | 5/1994 | Newman et al. | |
| 5,369,593 A | 11/1994 | Papamarcos et al. | |
| 5,648,920 A | 7/1997 | Duvvury et al. | |
| 5,822,217 A * | 10/1998 | Shenoy ............... | G06F 17/5045 716/108 |
| 5,864,487 A | 1/1999 | Merryman et al. | |
| 6,671,846 B1 | 12/2003 | Schultz | |
| 6,738,677 B2 | 5/2004 | Martin et al. | |
| 7,127,384 B2 | 10/2006 | Zolotov et al. | |
| 7,243,322 B1 | 7/2007 | Ly et al. | |

(Continued)

OTHER PUBLICATIONS

Leiserson, Charles E. and Saxe, James B., "Optimizing synchronous systems" (Jan. 1, 1982). Computer Science Department. Paper 2429. http://repository.cmu.edu/compsci/2429, 30 pages.

(Continued)

*Primary Examiner* — Phallaka Kik
(74) *Attorney, Agent, or Firm* — Cesari and McKenna, LLP; Omar M. Wadhwa

(57) ABSTRACT

A system and method tests for functional equivalence prior to automatically retiming a high-level specification. An Intermediate Representation (IR) includes one or more graphs or trees based on the high-level specification. A functional equivalence (FE) analyzer determines whether one or more components in the graph meet certain value and state conditions and thus is a candidate for retiming. A scheduler can use components that fail FE as a retiming boundary.

37 Claims, 17 Drawing Sheets

(56) References Cited

U.S. PATENT DOCUMENTS

| | | | |
|---|---|---|---|
| 7,454,324 B1 | 11/2008 | Seawright et al. | |
| 7,487,077 B1 | 2/2009 | Clune et al. | |
| 7,945,880 B1* | 5/2011 | Albrecht | G06F 17/5031 716/101 |
| 8,037,443 B1* | 10/2011 | Krishnaswamy | G06F 17/505 716/108 |
| 8,099,703 B1* | 1/2012 | Manovit | G06F 17/504 716/103 |
| 8,402,449 B1 | 3/2013 | Biswas et al. | |
| 8,438,511 B1* | 5/2013 | Hurst | G06F 17/505 716/104 |
| 8,584,064 B2 | 11/2013 | Matsuda | |
| 8,832,608 B1* | 9/2014 | Chakrabarty | G06F 17/505 716/51 |
| 8,990,739 B2* | 3/2015 | Gu | G06F 17/5081 703/16 |
| 9,558,306 B2* | 1/2017 | Narayanaswamy | G06F 17/5036 |
| 2003/0078684 A1 | 4/2003 | Martin et al. | |
| 2003/0126580 A1* | 7/2003 | Kurokawa | G06F 17/5045 716/103 |
| 2003/0182638 A1* | 9/2003 | Gupta | G06F 17/5022 716/108 |
| 2003/0192016 A1* | 10/2003 | Baumgartner | G06F 17/5022 716/106 |
| 2003/0192017 A1* | 10/2003 | Baumgartner | G06F 17/5022 716/113 |
| 2003/0192018 A1* | 10/2003 | Baumgartner | G06F 17/5022 716/108 |
| 2004/0044510 A1 | 3/2004 | Zolotov et al. | |
| 2004/0193933 A1* | 9/2004 | Pricer | H03K 5/135 713/401 |
| 2004/0225970 A1* | 11/2004 | Oktem | G06F 17/5059 716/114 |
| 2005/0149301 A1* | 7/2005 | Gupta | G06F 17/5031 703/2 |
| 2005/0289498 A1* | 12/2005 | Sawkar | G06F 17/505 716/104 |
| 2006/0075180 A1* | 4/2006 | Tian | G06F 17/5045 711/1 |
| 2006/0080626 A1 | 4/2006 | Ohba et al. | |
| 2006/0129961 A1* | 6/2006 | Paul | G06F 17/5045 716/103 |
| 2007/0226664 A1* | 9/2007 | Gemmeke | G06F 17/504 716/107 |
| 2008/0028347 A1* | 1/2008 | Hiraoglu | G06F 17/504 716/103 |
| 2009/0138837 A1* | 5/2009 | Baumgartner | G06F 17/504 716/113 |
| 2009/0326886 A1* | 12/2009 | Arbel | G06F 11/3608 703/6 |
| 2010/0125820 A1* | 5/2010 | Ispir | G06F 17/505 716/132 |
| 2011/0161066 A1* | 6/2011 | Kakkar | G06F 17/5022 703/15 |
| 2012/0131536 A1 | 5/2012 | Kitazawa | |
| 2012/0198398 A1* | 8/2012 | Mahar | G06F 17/504 716/102 |
| 2013/0297278 A1* | 11/2013 | Narayanaswamy | G06F 17/5036 703/14 |

OTHER PUBLICATIONS

Leiserson, Charles E. and Saxe, James B., "Retiming Synchronous Circuitry" (Aug. 20, 1986) Systems Research Center of Digital Equipment Corporation, Palo Alto, CA, 56 pages.

Van Antwerpen, Babette et al., "A Safe and Complete Gate-Level Register Retiming Algorithm" from "IWLS 2003 Twelfth Annual Workshop on Logic and Sythesis" May 28-30, 2003, 8 pages.

Retiming, from Wikipedia, the free encyclopedia, Nov. 27, 2012, en.wikipedia.org/wiki/Retiming, 3 pages.

* cited by examiner

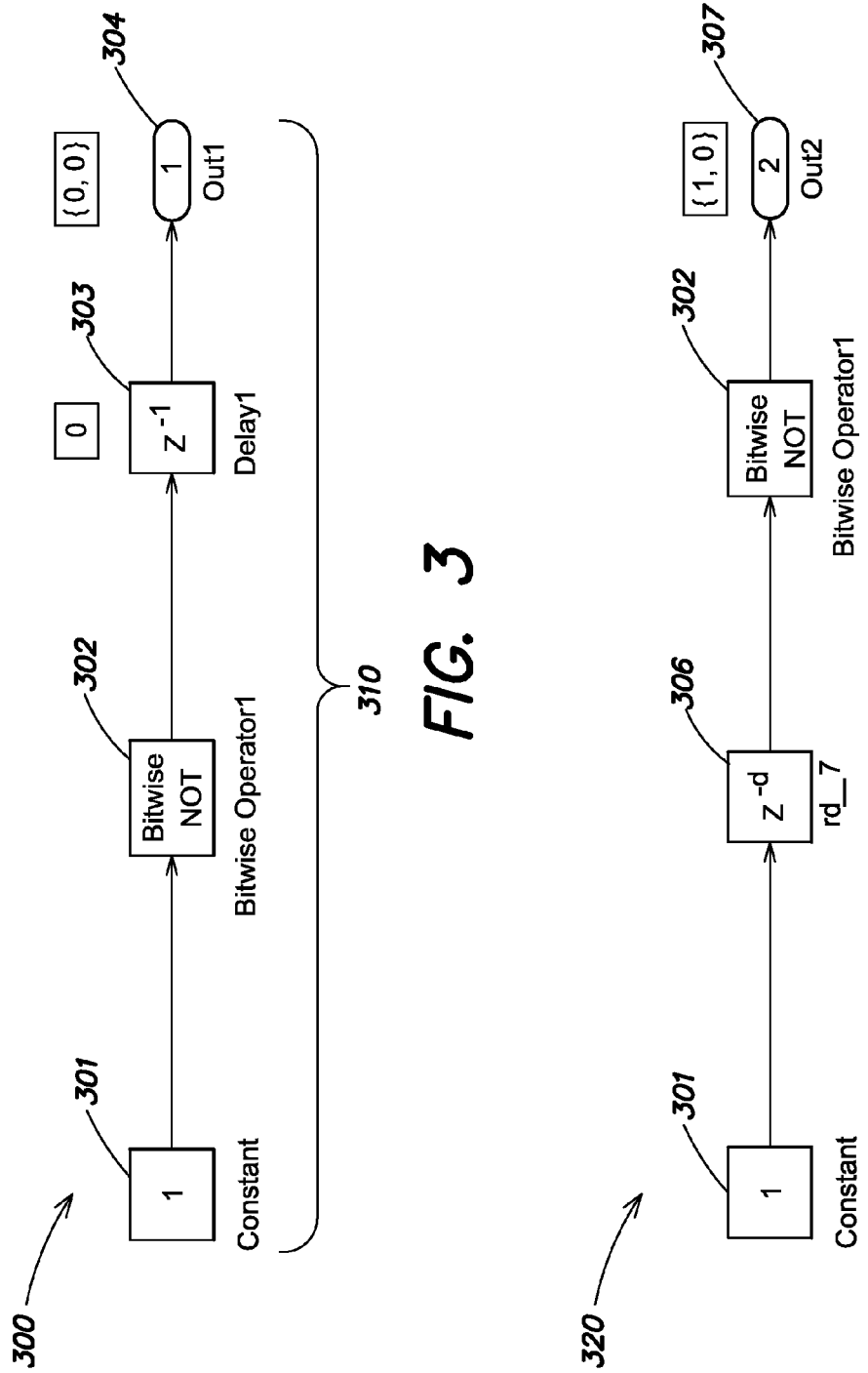

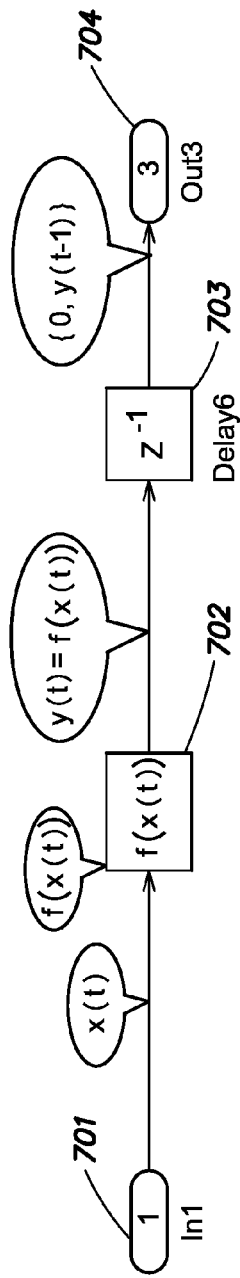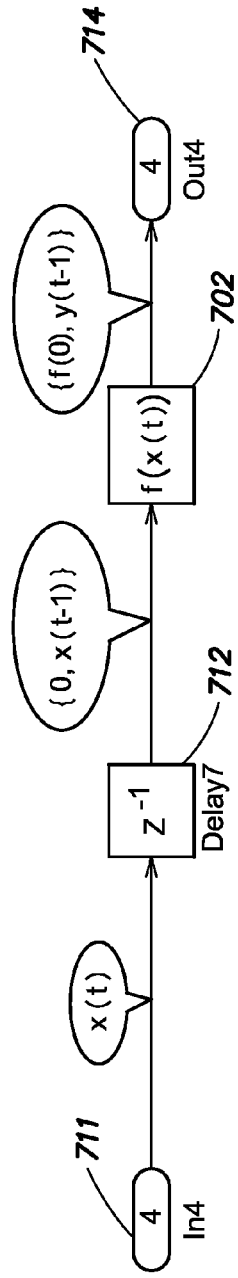
FIG. 7A
FIG. 7B

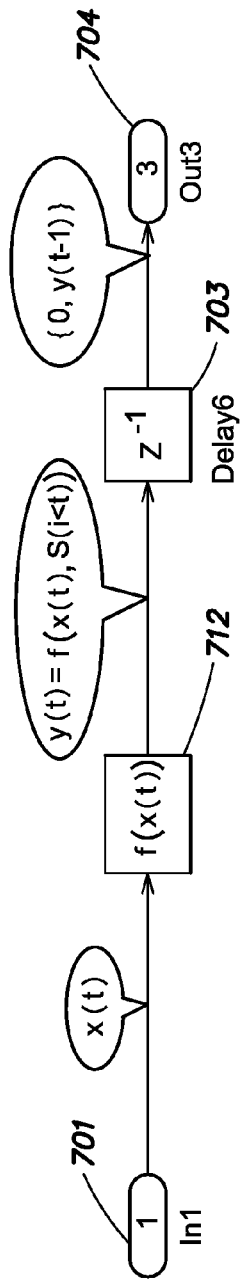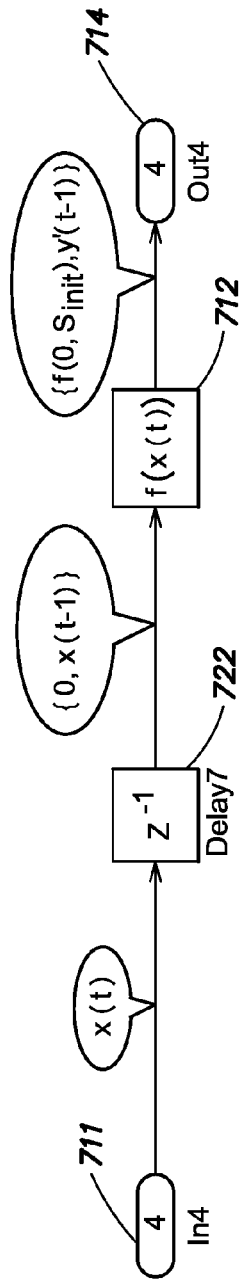

901 — * States have 0 as initial values.
902 — * f(0) = 0.
903 — * 0 at input does not change the component's state.

MODEL-BASED RETIMING WITH FUNCTIONAL EQUIVALENCE CONSTRAINTS

CROSS REFERENCE TO RELATED APPLICATION(S)

This application is a continuation in part of co-pending U.S. patent application Ser. No. 14/096,333 filed Dec. 4, 2013 entitled "Model-Based Retiming with Functional Equivalence Constraints" by Yongfeng Gu and Girish Venkataramani which in turn claims the benefit of U.S. Provisional Patent Application Ser. No. 61/733,255 filed on Dec. 4, 2012 entitled "Model-Based Optimization with Functional Equivalence Constraints" by Yongfeng Gu and Girish Venkataramani, and U.S. Provisional Patent Application No. 61/787,445 filed on Mar. 15, 2013 entitled "Model-Based Retiming with Functional Equivalence Constraints" by Yongfeng Gu and Girish Venkataramani, the entire contents of each of which are incorporated by reference herein.

BACKGROUND

One goal of circuit design and/or program coding is to optimize some aspect of a system with the goal of improving its quality. One such optimization approach, generally referred to as the retiming of a circuit, is a technique of moving the structural location of latches or registers in a digital circuit in order to improve performance, area, and/or power consumption in such a way that preserves behavior at the circuit's outputs. Automated techniques use a directed graph to represent the digital circuit under consideration, where the vertices of the graph represent asynchronous combinational blocks, and directed edges of the graph represent a series of synchronous registers or latches. Each vertex has a value corresponding to the delay through the combinatorial circuit. After constructing this representation, one can attempt to optimize the circuit by moving delay registers around from input to the output or vice versa.

BRIEF DESCRIPTION OF THE DRAWINGS

The description below refers to the accompanying drawings, of which:

FIG. 3 is an example of a logical system representing a digital circuit or program code to carry out a function;

FIG. 4A is an example retimed circuit;

FIGS. 7A and 7B are graphical views of an example constraint applied to provide functional equivalence;

FIGS. 8A and 8B are graphical views of an example constraint;

DETAILED DESCRIPTION OF AN ILLUSTRATIVE EMBODIMENT

Figure 1:
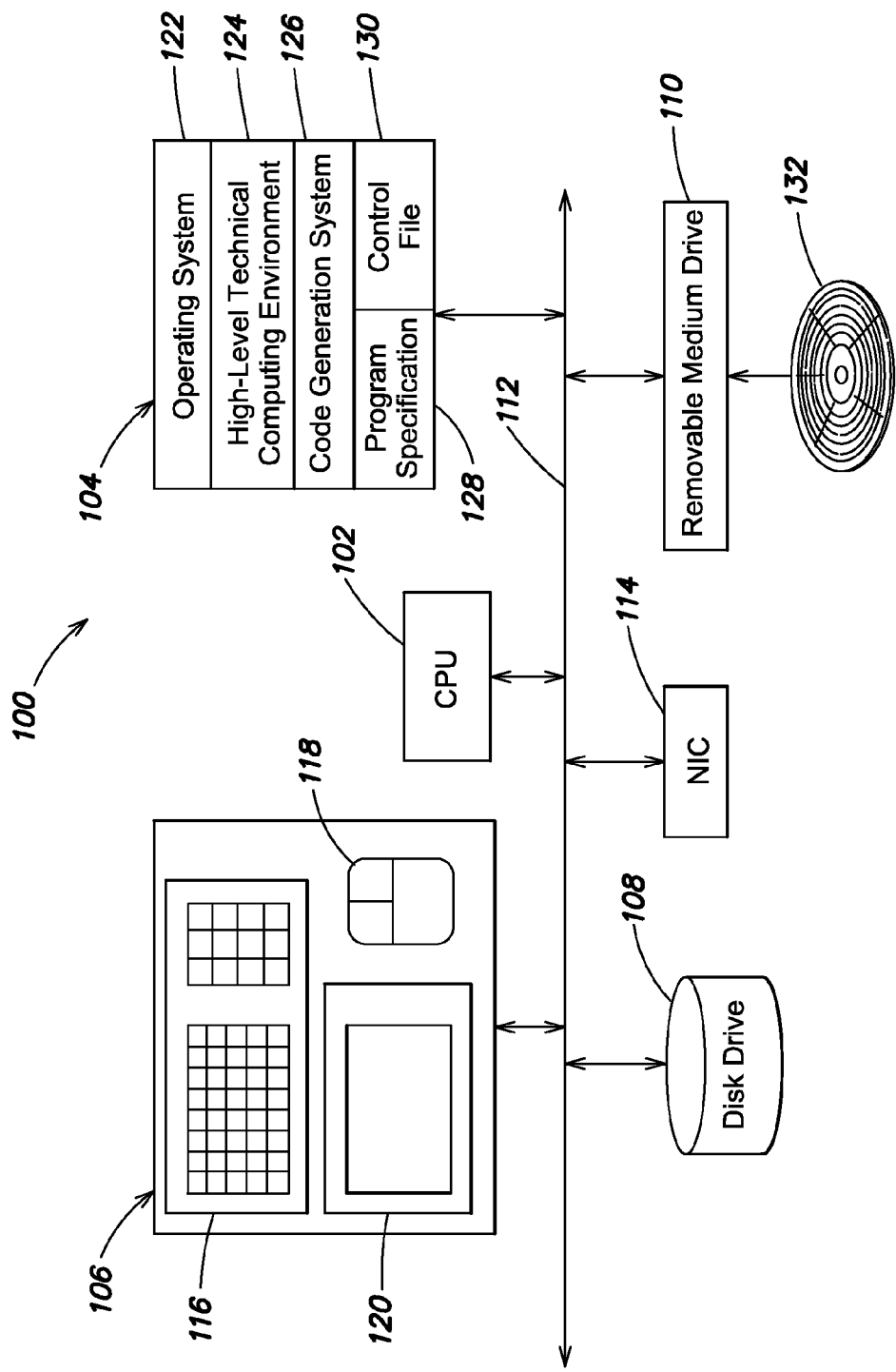
FIG. 1 is a high level diagram of an example data processing platform on which the present system and methods may be implemented.

A system and method for optimizing code, such as in one example, a hardware description language (HDL) code representation of a functional element such as a circuit, is generated from a program model created within a high-level development environment. Tools are provided for retiming or other optimization of the model, such as applying register pipelining to achieve retiming.

In one or more present approaches, an additional functional constraint is introduced to the model-based retiming of the design. In particular, a functional equivalence constraint is introduced to the design synthesis and made a top priority constraint. The functional equivalence constraint provides that a modified model of a component has the same functionality as the original model. Once the functional equivalence constraint is satisfied, then other constraints such as pipeline retiming and so forth can then be applied to the model.

In some embodiments, the functional constraint analyzes three conditions for a component of a graph to determine if functionally equivalent retiming is possible for the component (such as by moving a register across the component). These can include:

states internal to the component having zero as an initial value {initVal=0} zero input produces a zero output {f(0)=0)} zero input does not result in changed internal states

The functional equivalence analysis can be implemented in several ways. For primitive components, the semantics may be well known in advance. Information concerning functional equivalence can be readily determined or even stored within the model for these components. For example, a simple logical component such as a gain amplifier block is known to accept a zero input, to provide zero output in response to a zero input, and to not have any state changes given zero at the input. Therefore a gain component can be marked to satisfy the functional equivalence condition. On the other hand, a component such as a counter will change its state in response to clock signals, and thus will not pass the functional equivalence test. In still other instances, a logical inverter may prevent zero output. More generally, the functional equivalence analysis can check if the component (1) for a given input value, m, produces the same output value, m, and (2) the component does not change its internal state.

For more complex blocks, an initial value propagation based test can check for state changes. The tools can apply input conditions to test the component to determine if an internal state changes with a zero input applied, and if not, will report that it is safe to move a delay block across. However, if states do change with an applied input, then a conclusion can be reached that is unsafe to move a delay register across the component. It can be sufficient to test such components for compliance with zero, non-zero, and unknown inputs, and exhaustive testing can be avoided.

In some embodiments, the set of conditions used by the functional equivalence analysis may be less than or differ from the three conditions listed above.

In some embodiments, a user-designed subsystem may be analyzed to determine if it includes any components that are known to violate the functional equivalence constraints. Any blocks that are unsafe to retime can be used as boundaries to define partitions within the subsystem that groups blocks together that are safe to move. The analysis can suggest to the user that the partitioned subset(s) of the system can be individually retimed. With this approach, a subsystem that would have failed retiming with prior approaches can now be successfully retimed.

In some embodiments, the system includes an Intermediate Representation (IR) generator, a functional equivalence analyzer, a partitioner, a scheduler, an optimizer/pipeline insertion engine, and a code generator such as an HDL code generator. The IR builder receives a high-level specification created by a user. The high-level program specification may be a graphical model, a Stateflow® chart, a MATLAB functions/files/scripts, a Simulink MATLAB block, C, C++, System C or other C-like code, Auto ESL, a Resistor Transistor Language (RTL) description such as VHSIC Hardware Description Language (VHDL), Verilog or the like. The IR builder may create one or more graphs or trees, such as a data flow graph (DFG), based on the high-level program specification. The DFG may include a plurality of interconnected nodes each corresponding to an operation.

The functional equivalence (FE) analyzer then scans the components of the DFG (i.e., the nodes of the DFG) to check for compliance with the necessary conditions for functional equivalence.

The partitioner may then optionally identify components of the DFG that do not pass the FE scan. These failing nodes can then be used as boundaries to partition the DFG into subsections that will individually pass the FE scan.

The scheduler then uses a scheduling algorithm to produce an optimized design for the nodes, or subsections, of the DFG that pass the FE testing. The optimized design, for example, may apply a further constraint such as register pipelining to minimize combinatorial latency for each such subsection of the DFG.

In some embodiments, failing components that do not pass the FE scan may nonetheless be retimed, such as when functional equivalence is deemed to be less important than retiming improvements.

The code generator may then operate on the optimized DFG to generate optimized code.

I. High Level System Overview

FIG. 1 is a schematic illustration of an example computer system 100 for implementing and utilizing embodiments of a system for producing functionally equivalent code representing a design. The computer system 100 includes a central processing unit (CPU) 102, a main memory 104, user input/output (I/O) 106, a disk drive 108, and a removable medium drive 110 that are interconnected by a system bus 112. The computer system 100 may also include a network interface card (NIC) 114. The user I/O 106 includes a keyboard 116, a mouse 118 and a display 120.

The main memory 104 stores a plurality of libraries or modules, such as an operating system 122, and one or more applications running on top of the operating system 122, including a technical computing environment 124. The main memory 104 may also include a code generation system 126. The code generation system 126 may be configured as a toolbox or an add-on product to the high-level technical computing environment 124. Furthermore, a user or developer may create and store a program specification 128 and a control file 130. The control file may be stored on disk or represented in the main memory 104.

The removable medium drive 110 is configured to accept and read a computer readable medium 132, such as a CD, DVD, floppy disk, solid state drive, tape, flash memory or other medium. The removable medium drive 110 may further be configured to write to the computer readable medium 130.

Suitable computer systems include personal computers (PCs), workstations, laptops, palm computers, smart phones, tables, virtual machines, and other data processing devices, etc. Those skilled in the art will understand that the computer system 100 of FIG. 1 is meant for illustrative purposes only and that the present techniques may be used with other computer systems, processing systems or computational devices. The techniques may also be used in a networked, e.g., client-server, computer architecture, or in cloud-based environments.

Suitable operating systems 122 include the Windows series of operating systems from Microsoft Corp. of Redmond, Wash., the Linux operating system, the MAC OS® series of operating systems from Apple Inc. of Cupertino, Calif., and the UNIX® series of operating systems, among others.

As indicated above, a user or developer, such as an engineer, scientist, programmer, etc., may utilize the keyboard 116, the mouse 118 and the computer display 120 of the user I/O 106 to operate the high-level technical computing environment 124, and create the program specification 128 and the control file 130.

Suitable high-level technical computing environments for use with embodiments include the MATLAB® and SIMULINK® technical computing environments from The MathWorks, Inc. of Natick, Mass., the LabVIEW programming system from National Instruments Corp. of Austin, Tex., the Visual Engineering Environment (VEE) from Agilent Technologies, Inc. of Santa Clara, Calif., the Khoros development system from AccuSoft Corp. of Northborough, Mass., a C programming system, a JAVA programming system, and a C++ programming systems, other C environments, among still other environments. Those skilled in the art will recognize that the computer system 100 need not include any software development environment at all.

Those skilled in the art will understand that the MATLAB® technical computing environment is a math-oriented, textual programming environment for digital signal processing (DSP) design, among other uses. The SIMULINK® technical computing environment is a graphical, block-based environment for modeling and simulating dynamic systems, among other uses.

Figure 2:
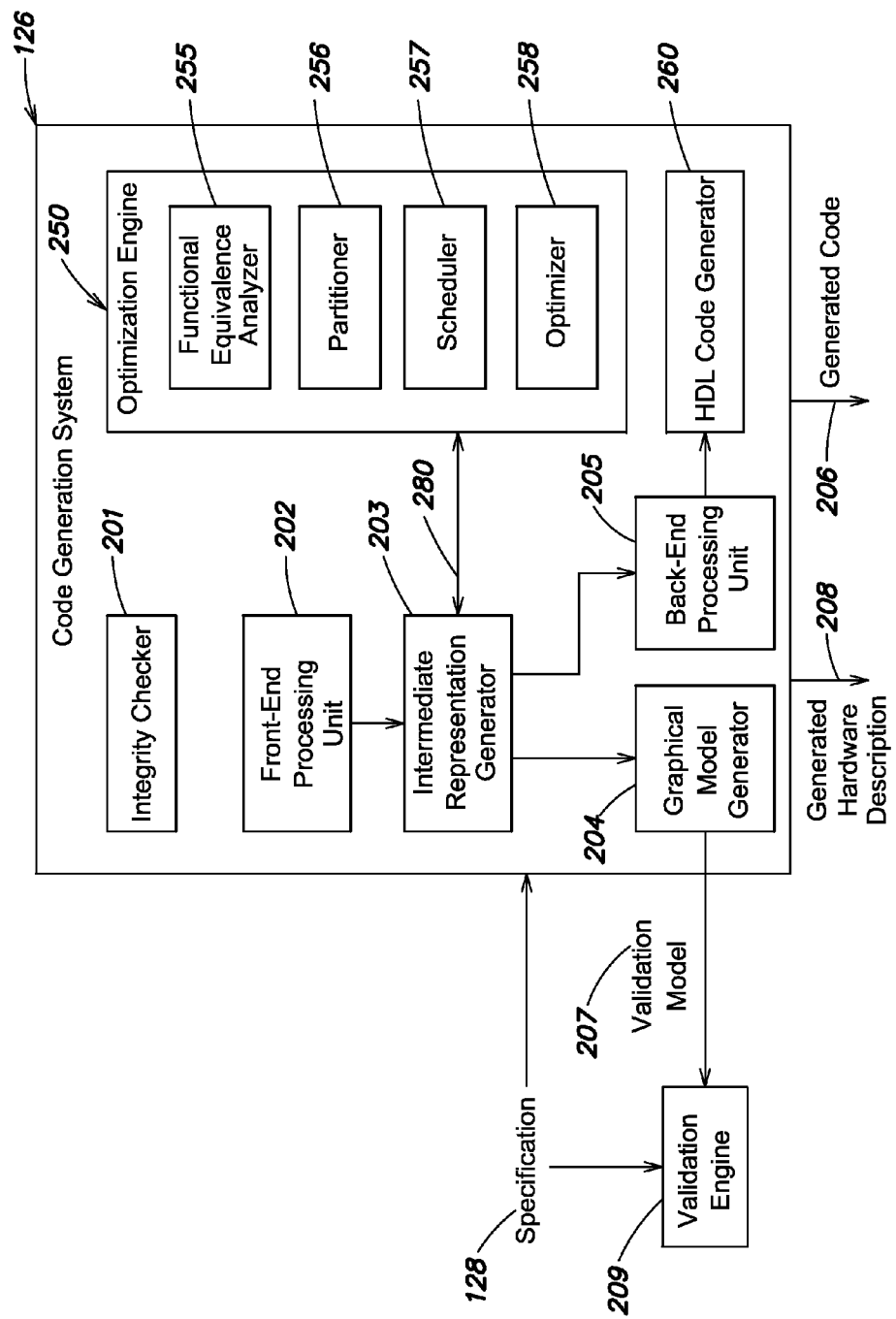
FIG. 2 is functional diagram of an example code generation environment.

FIG. 2 is a schematic block diagram of the code generation system 126. The code generation system may include an integrity checker 201, a front-end processing unit 202, an intermediate representation (IR) generator 203, a graphical model generator 204, a back-end processing unit 205, and an optimization engine 250. The code generation system 126 may receive the program specification 128 created by the user or developer with the high-level technical computing environment 124. The program specification may be a graphical model, such as a Simulink model, a block diagram a Stateflow chart, a high-level textual code listing, such as a MATLAB file, etc. The code generation system 126 may also receive the control file created by the user or developer. As described herein, the code generation system 126 may produce hardware description language (HDL) code 208, such as VHDL or Verilog code, that is optimized, e.g., through the inclusion of one or more pipelines or registers.

In alternative embodiments, the code generation system 126 may produce C, C++, SystemC code or other program code 206 in any number of other languages to be run on a programmable data processor or digital signal processor, including the language of the original program specification. The code generation system 126 may also produce one or more annotated versions of the program specification 128 as a validation model 207 to be used by an external design validation engine 209.

The code generation system 126 may include a plurality of components or modules. Specifically, the code generation system 126 may include an intermediate representation (IR) generator 203 that is configured to create one or more IRs from the program specification 128.

The code generation system 126 may also include an optimization engine 250 that comprises a functional equivalence analyzer 255, a partitioner 256, a scheduler 257, an optimizer/pipeline insertion engine 258, and a Hardware Description Language (HDL) code generator 260.

The IR generator 203, functional equivalence analyzer 255, partitioner 256, scheduler 257, and the HDL code generator 260 are functions that may each comprise registers and combinational logic configured and arranged to produce sequential logic circuits. In the illustrated embodiment, these functions are software modules or libraries containing program instructions pertaining to the methods described herein, that may be stored on computer readable media, such as computer readable medium 130, and executable by one or more processing elements, such as CPU 102. Other computer readable media may also be used to store and execute these program instructions. In alternative embodiments, various combinations of software and hardware, including firmware, may be utilized to implement the principals taught herein.

II. Functional Equivalence Analyzer 255

The functional equivalence analyzer 255 accepts input as to whether the user wishes to enforce certain suggested functional constraints prior to applying component retiming constraints. To understand how the functional equivalence analyzer operates, consider first the example schematic illustration of a logical system representing a digital circuit or program code to carry out a particular function shown in FIG. 3. The representation may take the form of a graphical model (such as a data flow graph DFG) 300. As shown, the graphical model 300 may include a plurality of blocks interconnected by lines that establish mathematical or other relationships between the blocks. Lines may alternatively or additionally represent signals. Each block, moreover, may correspond to a functional element, such as a mathematical, logical, statistical, input/output (I/O) operation, filter, programming construct, such as IF-THEN-ELSE, loops, etc. The graphical model 300 may also include one or more embedded code blocks (not shown). An embedded code block allows a user to incorporate textual code into a graphical model. A suitable example of an embedded code block is an Embedded MATLAB (EML) function block from The MathWorks Inc. The EML function block supports a subset of the functions provided by the MATLAB technical computing environment. Other code blocks can originate as Stateflow charts, or other known logic or high level program specifications.

The graphical model 300 and other graphical models discussed in this document are meant for illustrative purposes only, and those skilled in the art will recognize that other models, e.g., having different types or arrangements of blocks, etc., may be created by the user. For example, in one embodiment, one or more of the graphical blocks may represent a subsystem that further comprises a plurality of interconnected blocks and/or subsystems. In still other embodiments, the model may originate in other than graphical form, such as a textural model.

A. Example Functional Equivalence Test for Zero Initial Value

In the specific example of FIG. 3, the graphical model 300 includes four blocks representing a subsystem 310 made up of four elements: an input signal block 301 (constant), a bitwise NOT operator 302, a delay block ($z^{-1}$) 303 and an output block 304. The subsystem 310 applies the bitwise NOT operation to the input signal and adds a one cycle delay.

The basic process of retiming the graphical model 300 can involve moving delay blocks, such as the $z^{-1}$ delay block 303 in the data flow. In the example shown in FIG. 4A, a retimed graphical model 320 is generated by retiming the graphical model 300 by moving the $z^{-1}$ delay block 303 from a position after the bitwise NOT operator 302 to a position before the bitwise NOT operator 302. The retimed graphical model 320 also replaces the $z^{-1}$ delay block 303 with another delay block $z^{-d}$ 306. It may be the case, that for example, a retiming analysis indicates that by moving the delay block in this way, the overall system is improved.

With the particular example in FIG. 4A, however, a functional equivalent retimed model 320 will not result. More particularly, the graphical model 300 (FIG. 3) provides a zero output in the first clock cycle, due to an initial zero condition of the delay block 303, and then another zero output when a constant logic one is applied to the input on the second clock cycle (this value sequence is indicated by a {0,0} notation next to the output block 304). This result is because an initial output of the delay block 303 is zero (as indicated by the numeral "0" in the box next to block 303). However, the output 307 of the retimed model output 320 for the first two clock cycles is {1,0} since the initial output of the moved delay block $z^{-d}$ 306 is zero. A logic one is thus output in a first clock cycle before providing a zero output in the second clock cycle in the retimed model of FIG. 4A. Therefore, the retimed graphical model 320 is not an exact functional equivalent to the original graphical model 300.

The approach of some embodiments is to ensure that the transformed component model has the same functionality across clock cycles. This functional equivalence requirement can be applied as a constraint prior to applying retiming constraints.

Figure 4B:
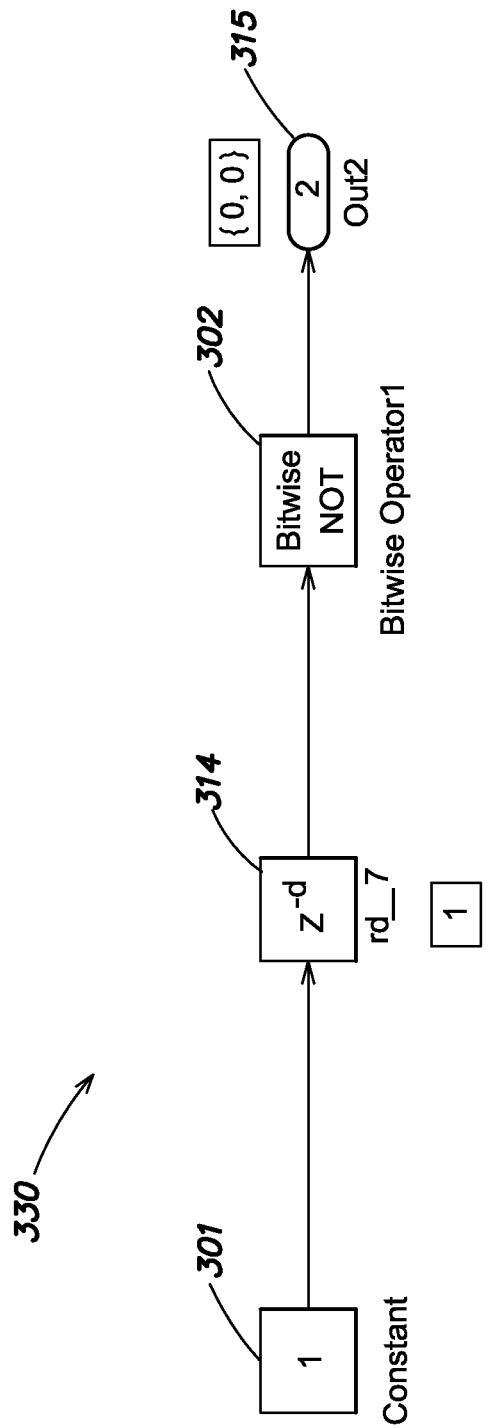
FIG. 4B is another example retimed circuit.

One might consider that a possible solution here is presented by the circuit 330 of FIG. 4B where the delay block 303 is replaced with a delay block 314 that is designed to force a logic one {1} as an initial condition (as indicated by the numeral "1" shown next to block 314). If that is done, an equivalent initial state can be provided to the circuit and functional equivalence results so that output 315 exhibits the same behavior as output 304 is in graphic model 300. However, this approach requires some modification to the logic of the original circuitry. While this example is somewhat simple, more complicated circuits may not easily lend themselves to this type of redesign. Furthermore, it can be shown that solutions to this problem, involving backwards justification of initial states, can become a non-deterministic, polynomial-time hard (NP hard) problem with limited solutions.

Figure 5A:
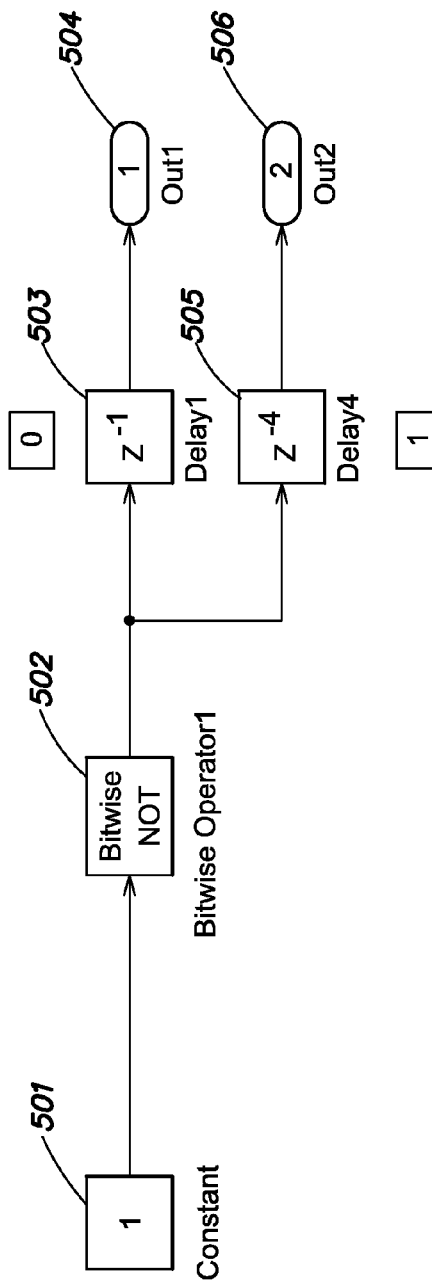
FIGS. 5A and 5B are still other example circuits.
Figure 5B:
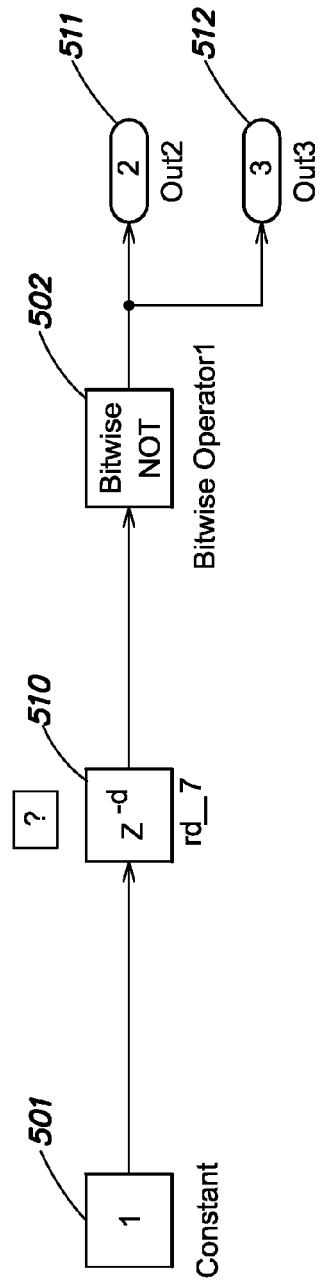
Figure 6:
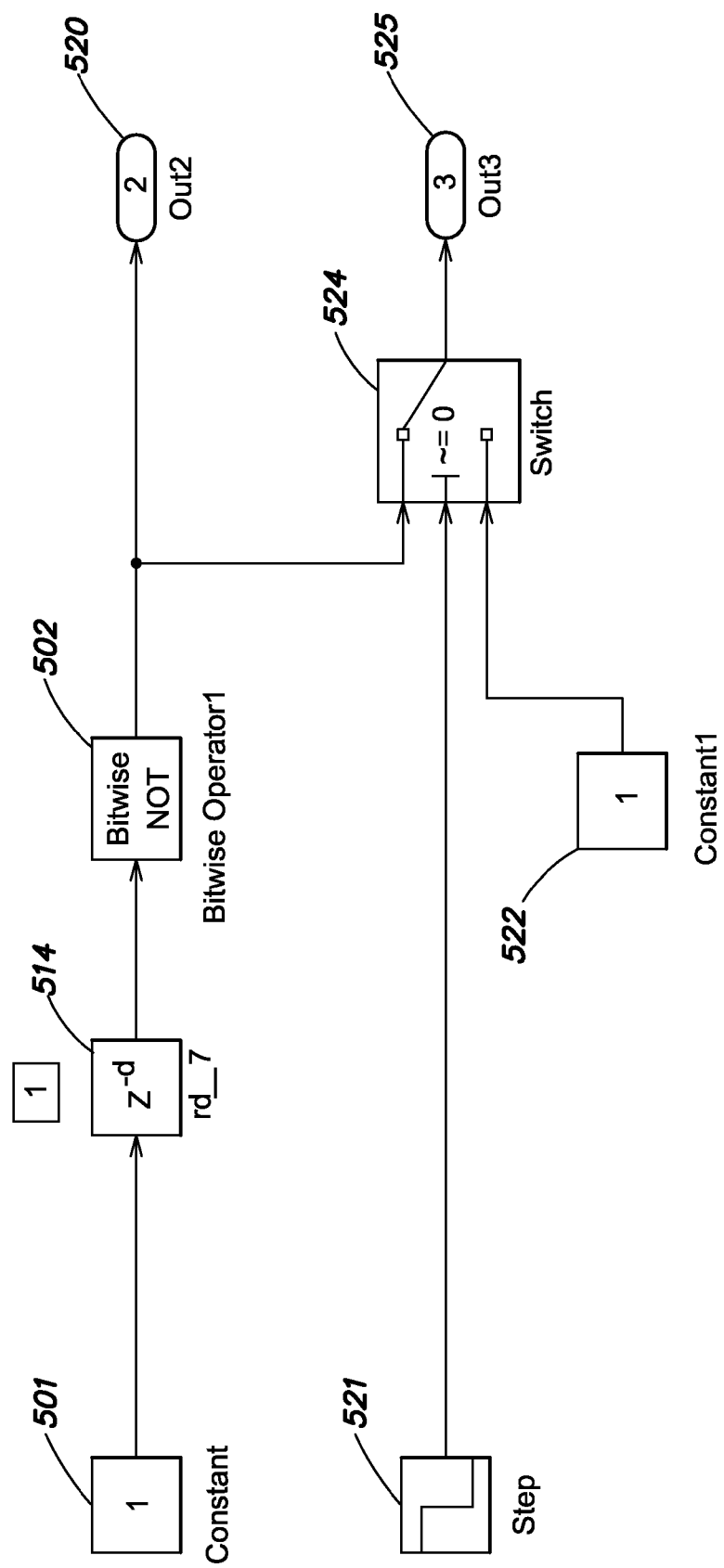
FIG. 6 is another example circuit.

In another situation, it may even be impossible to redesign the circuit as an equivalent initial state can be provided. Consider the example of FIG. 5A. In this graph, a bitwise NOT operation 502 feeds a pair of delay blocks ($z^{-1}$ 503 and $z^{-4}$ 505) operating in parallel, providing {0} and {1} as respective initial output states. It is possible that an optimized circuit could be provided by instead using a single delay 510 that is moved to a position prior to the bitwise NOT operation, as suggested in FIG. 5B. However this solution will not work, as it results in an impossible equivalent initial state problem for the repositioned delay block 510. One remedy here might be to add additional functional elements to the circuit such as shown in FIG. 6. As one example, this could be provided by adding a switch 524 with a step input control 521. The FIG. 6 circuit is then functionally equivalent to that which was shown in FIG. 5A. However, this solution introduces additional logic components thereby becoming a less than ideal solution.

A more desirable solution enabled by some embodiments is to still allow for register re-timing by moving delays in the circuit around but by first applying functional equivalence as a top priority constraint. This approach provides that one does not introduce a different result by moving the delay blocks around. Once functional equivalence is confirmed, then the automated design tool can apply more constraints such as minimizing and/or reducing the retiming.

Two additional constraints are applied in some embodiments: that no additional logic should be introduced into the model, and that the functional equivalence method should be capable of being performed quickly.

FIGS. 7A and 7B represent a graphical view of an example constraint that may be applied to check for functional equivalence. In this example, retiming is performed by moving a delay block 703 across a functional block f(x) 702 that includes only combinatorial logic. Specifically the functional block f(x) 702 is entirely composed of combinational logic. As part of functional equivalence testing, operation of the functional block f(x) 702 can be checked to determine the effect of moving the delay block 703 from an output side to an input side.

A first property to check is to determine whether an initial condition of a retimed circuit provides an initial value of zero for internal states of the function y(t)=f(x(t)).

A second condition to test is whether a zero input to the retimed graph component produces a zero output value, e.g., {f(0)}=0.

FIGS. 8A and 8B represent a third constraint that can be tested for when the delay component 703 is moved across a component function f(x) 702 resulting in a retimed delay 722. Here, component function 702 may itself contain states, such that $$<y(t),S(t)>=f(x(t),S(i<t))$$

This will typically be the case for component functions f(x(t)) 702 where the logic is not strictly combinatorial, e.g., where the component function 702 may assume different internal states S(t). The property to check for such a condition is $$f(0,S_{init})=<0,S_{init}>,\text{ if 0 is the initial value in the delay being moved}$$

or in other words, the test is whether applying a logic 0 to the input does not change the component's 712 state.

Figures 9, 10:
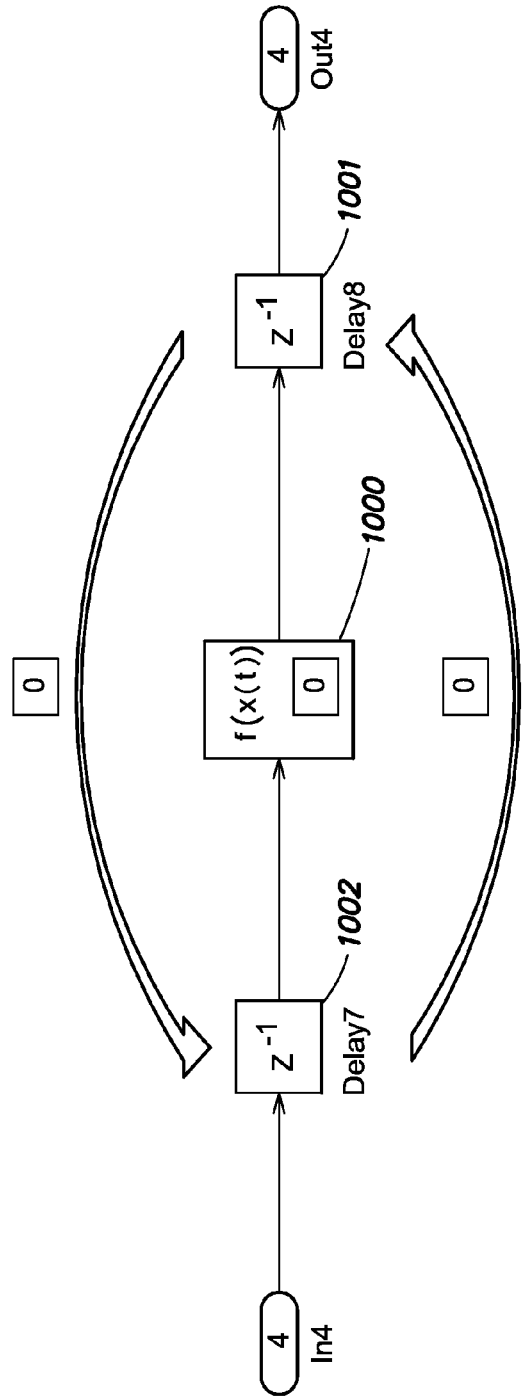
FIG. 9 is an example data structure storing an example list of conditions.
FIG. 10 is a graphical depiction of the conditions of FIG. 9.

FIG. 9 lists these three possible conditions to conclude functional equivalence retiming is possible for any arbitrary function. In particular the following things may be checked:

1. whether the component has an initial value of zero for its internal state(s) {InitVal=0} (901);

2. whether applying zero at the input produces zero at the output {f(0)=0} (902); and 3. whether applying a 0 at the input does not change the component's state (the component could have conflicting internal states as long as the external state does not change) (903).

These conditions can be graphically depicted as in FIG. 10, where a component 1000 is the logic function being tested, and delay blocks 1001 and 1002 are being evaluated for possible retiming.

If at least two or more of these tests are true, the component 1000 is a viable candidate for further optimization, such as retiming by moving the delay components 1001, 1002 backward or forward in the pipeline. However, in some embodiments, it can be concluded that retiming is not possible for a component 1000 if the test for one or more of the above conditions is negative, or unknown.

For example, a user may set code generation options so that the model may be optimized by implementing retimed pipelines (e.g. via the pipeline insertion engine 258) where multiple instructions or operations are overlapped in time. This may involve reconsidering the placement of registers to break up computation into multiple units and executing a scheduling algorithm to produce a revision to the original graph.

Figure 11:
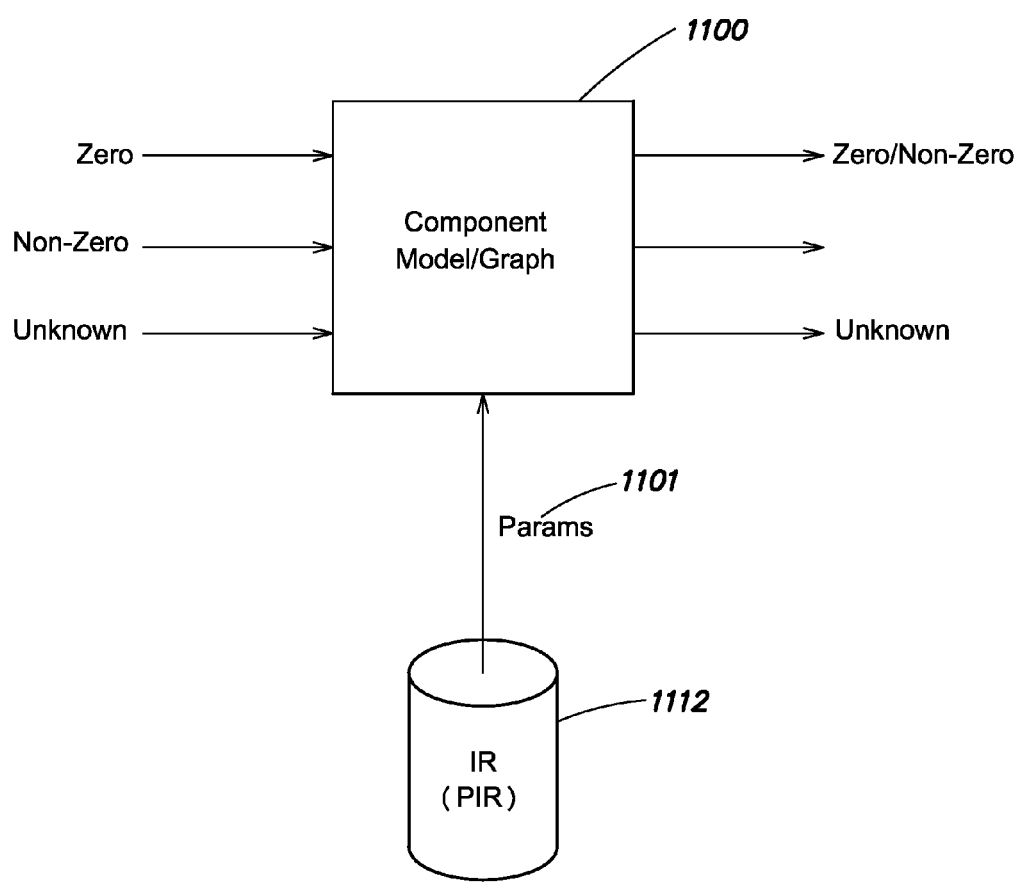
FIG. 11 is a high-level depiction of logic to implement functional equivalence analysis.

FIG. 11 is a high level depiction of logic for implementing functional equivalence (FE) analysis 255. The figure shows a model 1100 of a component in question, as well as any parameters 1101 for determining how the component operates. The model 1100 includes a description of the component, initial condition logic of the component, state information, and input parameters. This information can be accessible in a design tool environment via an intermediate representation (IR) model such as may be provided by an IR component database 1112. The IR may be a Parallel Intermediate Representation (PIR).

The FE analysis 255 can access the component model 1100 and examine a behavior of the model 1100. In some embodiments, the FE analysis 255 need not apply an exhaustive set of inputs, for example, inputs can be restricted, such as to zero, non-zero, and unknown input states. In some embodiments, output testing can also be restricted, such as for zero, non-zero, and unknown output states.

The first condition is the initial value zero test. This may be determined checked by examining the component model 1100 to determine its initial specified value(s). It should be understood that if the component model 1100 contains a further sub-graph with multiple elements that may specify initial states, then the initial states values of all of such sub-graph elements may be checked.

The second condition, that is, whether applying a zero at the input results in zero at the output, may be determined by exercising the component model 1100 and observing a response to a zero input.

Figure 12:
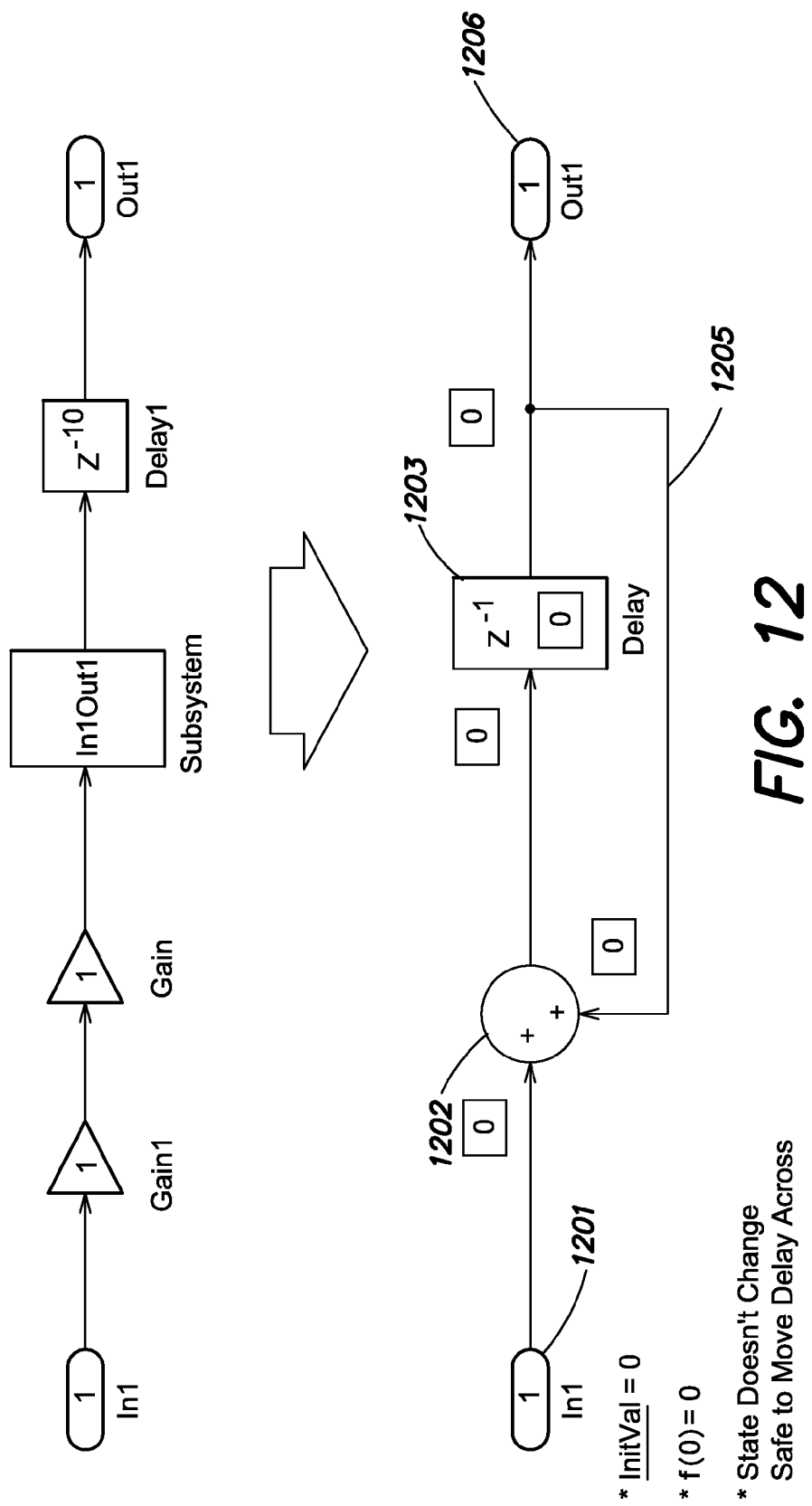
FIG. 12 is an example of an analysis for the conditions of FIG. 9.

Testing for compliance with three conditions may include knowing or analyzing the semantics of each component model 1100. A suitable initial value propagation process in FIGS. 12 and 13 may use computer techniques, such as constant propagation optimization, to check compliance with the this constraint. In some embodiments, complete semantic analysis of the component is not required. In that case, determining if the component internal states do not change with a zero input may be sufficient.

For components made up entirely of static circuit elements, the analysis results for the three tests may be known in advance. The known analysis results may be stored with a model of the component to expedite the analysis for possible retiming. For example, a simple gain block is known in advance to pass all three tests, since a gain block has an initial zero value, produces zero output with zero input, and does not assume internal logic states. However, for other components, such as a counter, it is known in advance that such components will fail the second and third condition (because, for example, a counter will possibly automatically change state and advance to a next value on a next clock cycle, regardless of input values).

The logic for FE analysis 255 may also automatically presume that a user-designed block will not pass the three tests and mark the user-designed block accordingly.

More generally, a CompRoughSemantics process may perform an initial value propagation analysis, using the component model 1100, to determine whether the component results in any state changes. An example of how that process performs this analysis for the third condition is described in connection with FIG. 12. Here the example component is a subsystem that consists of an adder 1202 and a delay 1203 with feedback 1205 to the adder. The component passes the initial value equal zero {InitVal=0} and zero input results in zero output {f(0)=0} tests, such as via initial constant value propagation. The third test is then performed by propagating the initial value zero through the various nodes of the graph. Here it is seen that a logic zero value applied at the input does not result in any state change, in either the adder 1202 or the delay 1203 component within the subsystem. Therefore it is safe to conclude that moving delay $z^{-1 0}$ 1203 from the output to the input produces a functionally equivalent design.

Figure 13:
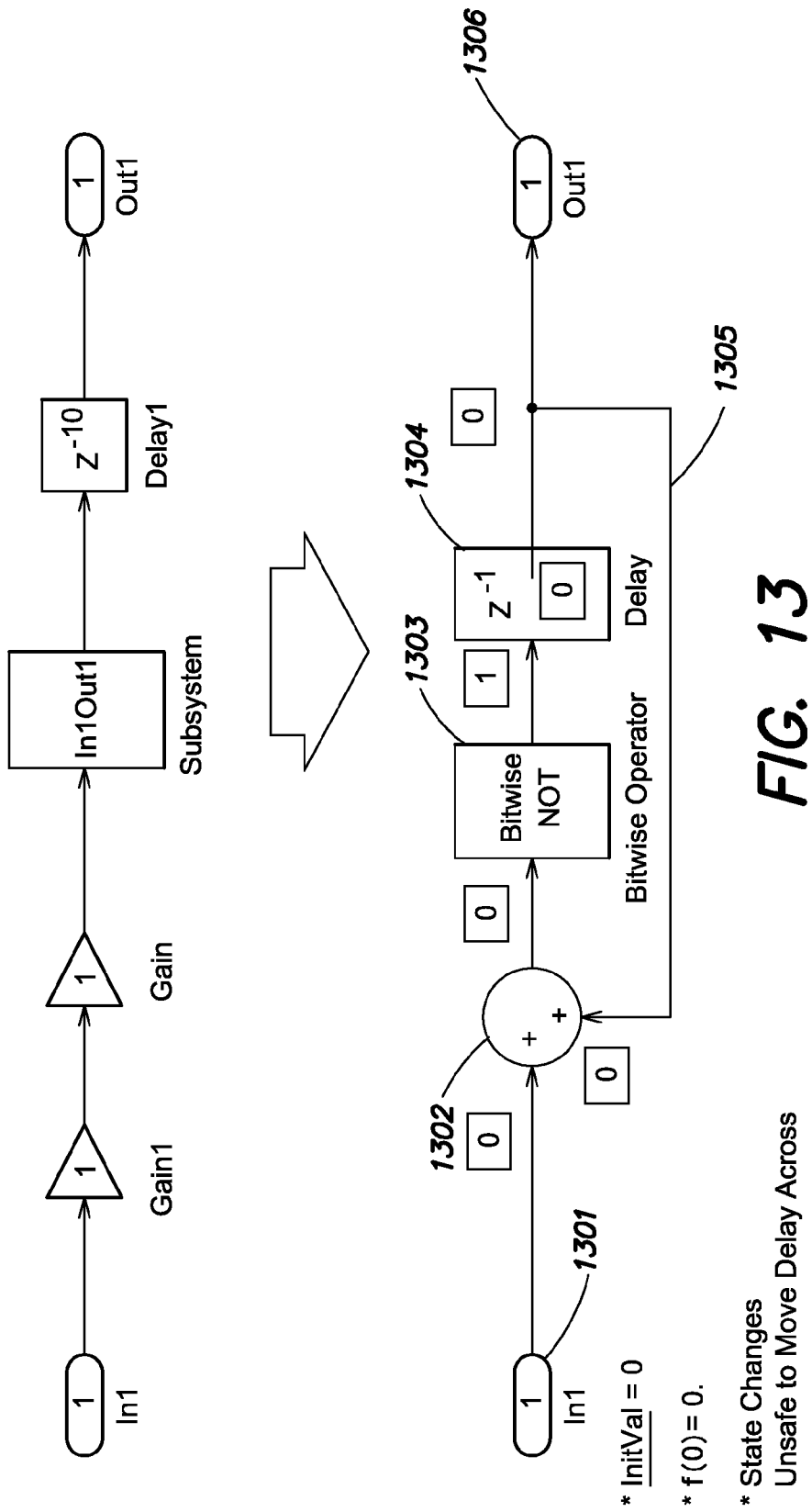
FIG. 13 shows an example system.

However, with another example, that shown in FIG. 13, the result is different. The is component here is a subsystem that includes an adder 1302 and delay 1304 as in FIG. 12, but which adds a bitwise NOT 1303 operation in a forward path. While the component passes the InitVal=0 and f(0)=0 tests, initial value propagation analysis indicates failure of the third condition. Specifically, when applying zero to the input, the bitwise NOT 1303 inverts the input to the delay 1304, and as a result, also affects a feedback loop 1305. This causes a state change in the adder output. Therefore, a state change occurs with this component and thus, it is not safe to move the delay block across the bitwise NOT operator, and this circuit should not be re-timed.

If the component being analyzed comprises one or more user-defined circuit blocks or functions, in some embodiments, FE analysis 255 may automatically presume that it will violate at least one of the three rules for functionally equivalent testing.

The FE analysis 255 may be relatively simple. The first two conditions are straightforward input and output checks of the component graph. The analysis for compliance with the third condition may also be simple. For example, if there are no state blocks in the graph then the third constraint may be presumed to pass. And if there are state blocks in the component under analysis, it may then be submitted to semantic value propagation testing. In addition, only zero, nonzero and unknown states can be applied in the semantic testing.

It is possible in some implementations that the InitVal and f(0) tests may use other values to determine functional equivalents. Thus, these tests may be generalized to InitVal=K and f(x)=x. However, it may become more difficult to design components for the generalized InitVal condition (in some embodiments, components assume a zero initial condition value). It can also be difficult to ensure components also provide a given output when given the same input—indeed the problem may become an NP hard problem to ensure operating conditions are guaranteed to produce an expected result other than zero output.

B. Formal Proof for More General Initial Conditions

The Parallel Intermediate Representation (PIR) mentioned above can be more formally defined as PIR=(V,E), where v∈V and e∈E are the nodes and edges of the PIR graph respectively. In the PIR, it can be assumed that every edge, e ∈E, has exactly one driving node, referred to as Src(e)∈V and may fanout to a number of destination nodes, Dst(e) ⊆V.

For illustration of a more general case of non-zero input, referring back to the simple example of FIGS. 3, 4A and 4B, if in the original design, the delay block 303 is at the output of the bitwise-NOT node 302, then output of the circuit 300 is {0,0} because the initial (reset) value of delay is 0. However, if the delay 306 is retimed to the input of the NOT node 302 then the output 307 changes to {1,0}, thus violating functional equivalence in this trivial case. Clearly, in the presence of more complex arithmetic and feedback loops, the situation becomes more complex and possibly even irrecoverable. In some embodiments, a set of formal conditions, which if satisfied by the graph, will provide functional equivalence no matter how the graph is retimed. Based on these conditions, the retiming algorithm can be applied on the PIR graph without violating functional equivalence.

In some embodiments, when a register is retimed, its initial value may also be changed to maintain functional equivalence. For example, in FIG. 3 and FIG. 4A, if the delay's initial value is changed to 1, then {0,0} would have been produced and functional equivalence maintained as per FIG. 4B. Thus, when retiming initial values may be calculated to provide an equivalent initial state for retimed delays; this is NP-hard for arbitrary logic. In some cases, finding an equivalent initial state may be impossible unless additional logic is added.

Instead of determining the initial values for retimed registers, conditions may be is defined under which the initial values of retimed registers do not have to change and the circuit is still functionally equivalent. Based on this, this condition may be called functional equivalent retiming or FE retiming. The conditions for such safe retiming may be formally defined.

Theorem 1:

For a node, v∈V, let y(t)=F(x(t),s(t)) be its output function at time t, and s(t+1)=S(x(t),s(t)), be its state update function at time t; x(t) and s(t) are its input and internal state variables at time t. For a given constant m, v is said to be retiming-safe in m and a register can safely be moved from output to input (or vice-versa) if and only if it satisfies the following two conditions:

1) F(m, s(0))=m.
2) S(m, s(0))=s(0).

Proof:

The conditions simply check that the initial values of v do not change when the input is m and that the output is also always m. Consider FIGS. 8A and 8B again but now with the input being m. When the delay with initial value of m moves backward across v, its input sequence changes from {x(t)} to {m, x(t−1)}, and its state variable sequence from {s(t)} to {s(0), s(t−1)}, while its output sequence remains as {y'(t)}={m, y(t−1)}={y(t)}. In other words, when the delay 703 is on the node's output, the graph's output is {m,y(t)} as suggested by FIG. 8A. When the delay 712 is retimed to the input of v, the input to v changes from {x(t)} to {m, x(t−1)} as per FIG. 8B. Because S(m, s(0))=s(0), the state variable does not change for the first cycle, with v remaining in its initial state. In the second cycle, because the input to v resumes the original input sequence and v itself is still in the initial state, v behaves as same as in the pre-retimed sub-graph only with one cycle delay. Therefore the output sequence of v is {y'(t)}={m,y(t−1)}. This is also the output sequence of the retimed sub-graph. Moving delays forward across v just reverses these steps and has the same result.

The intuition behind the conditions is to define the steady-state of the circuit during retiming. For a given input value, m, if the circuit produces the same output value, m, and it does not change the internal state, then we say that it is retiming-safe in m. is Based on this, a retiming-safe sub-graph may be determined.

Lemma 1:

If nodes u and v are connected back to back and both are retiming-safe in m, then the path through u and v is also retiming-safe in m.

Proof:

Assume that u is at the input of v. Since they are both retiming-safe in m, they both satisfy F(m,s(0))=m. When u takes input m, it outputs m on the edge connecting the nodes; thus input to v is also m and thus it also outputs m. Therefore as an entity, the path of u followed by v satisfies F (m, s(0))=m. By the same logic, S(m, s(0))=s(0) for both nodes and thus for the path as a whole. Thus, the whole path is retiming-safe in m.

Theorem 2:

Moving a delay with initial value of m in a graph does not change the graph's initial state, if all nodes of the graph are retiming-safe in m, and thus the graph is retiming-safe in m.

Proof:

If all nodes in the graph are retiming-safe in m, and m is injected in to the graph's inputs, then all edges in the graph acquire a value of m. Thus, if a delay, whose initial value is also m, is moved arbitrarily across a node, it does not change the value on any edge in the graph and thus does not affect any of the initial state.

Thus, if a retiming-safe (in m) graph where all nodes are retiming-safe in m may be constructed, then retiming may be safely applied without having to re-compute initial state of retimed registers. However, in many instances it is practical to we use m=0. This is because most registers have an initial state of 0 and most arithmetic operations are retiming-safe when m=0, e.g., for addition and multiplication, F(0)=0 irrespective of their other properties.

III. Using FE Analysis 255 to Suggest Subsystem Partitioning (Partitioner 256)

Next is described the operation of the partitioner (element 256 in FIG. 2), which uses the results of functional equivalence (FE) analysis 255 to partition a design into is groups of components or nodes that can each be submitted to subsequent retiming of the graph.

Figure 14:
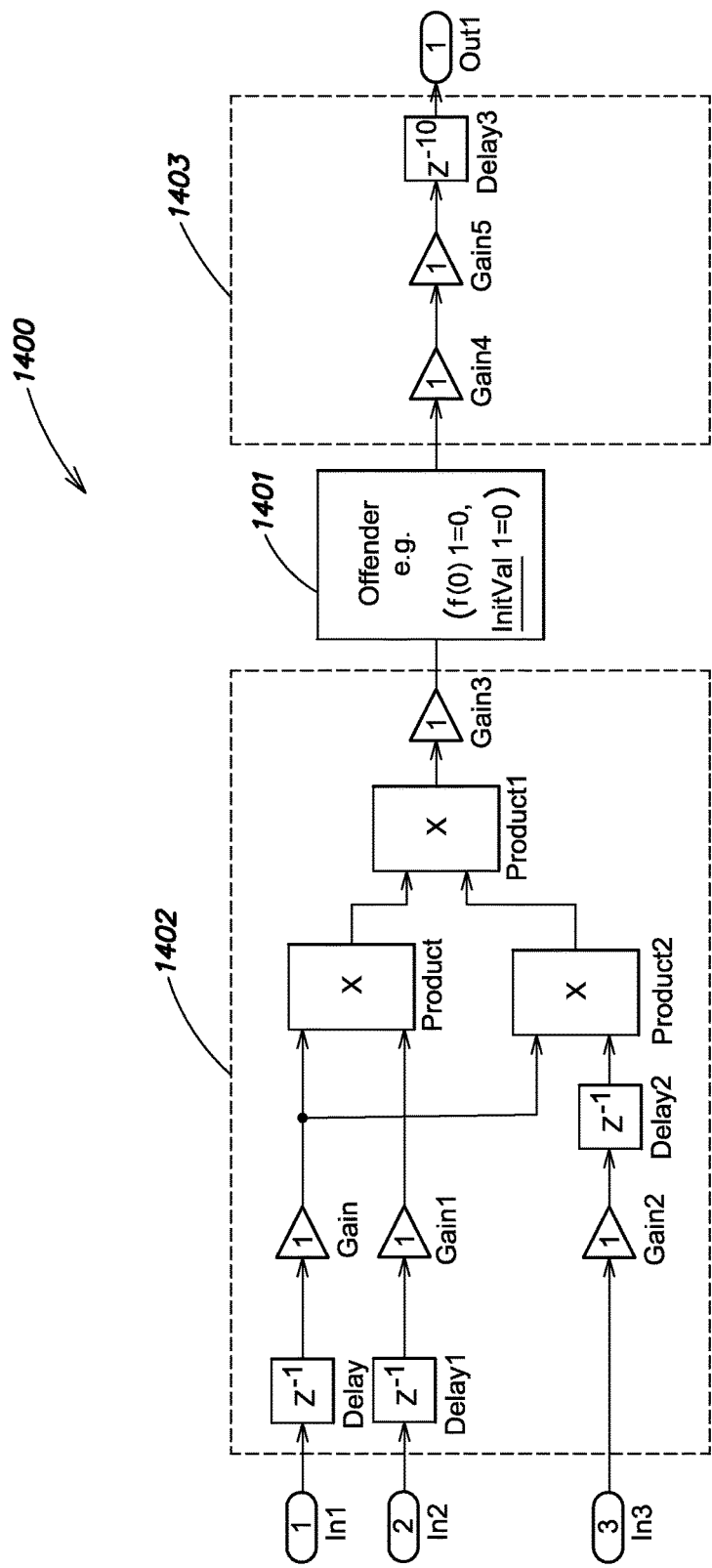
FIG. 14 illustrates an example for dividing a system.

In an example shown in FIG. 14, FE analysis 255 has indicated that an "offender" function 1401 does not pass. In some embodiments, the presence of the offender component 1401 may prohibit retiming of an entire subsystem 1400. As a result, nothing is retimed in such a subsystem. However, many other components in the subsystem 1400, a group 1402 of components to the left of the offending block 1401 and a group 1403 of components to the right of the offending block 1401, do meet all three conditions.

In some embodiments, a concept of fine partitioning is applied. In fine partitioning, partitions with components for which it is safe to move the delay across are created. In effect, offending blocks such as the offending block 1401 become boundaries that divide the subsystem 1400 into one or more new graphs that do exhibit functional equivalence and therefore can individually be retimed. In the example of FIG. 14, the group 1402 of components to the left of the offending block are thus grouped together and retimed separately from the group 1403 of components to the right of the offending block. The offending block 1401 is left alone and not retimed.

Fine partitioning permits improving subsystems 1400 that have only some components fail the FE test. Fine partitioning also reduces the retiming complexity as a graph with E edges and V nodes to (~O(V·E·log E)). The approach may work on a smaller graph by excluding non-functional equivalent components, thus reducing time, as V and E become smaller.

Figure 15:
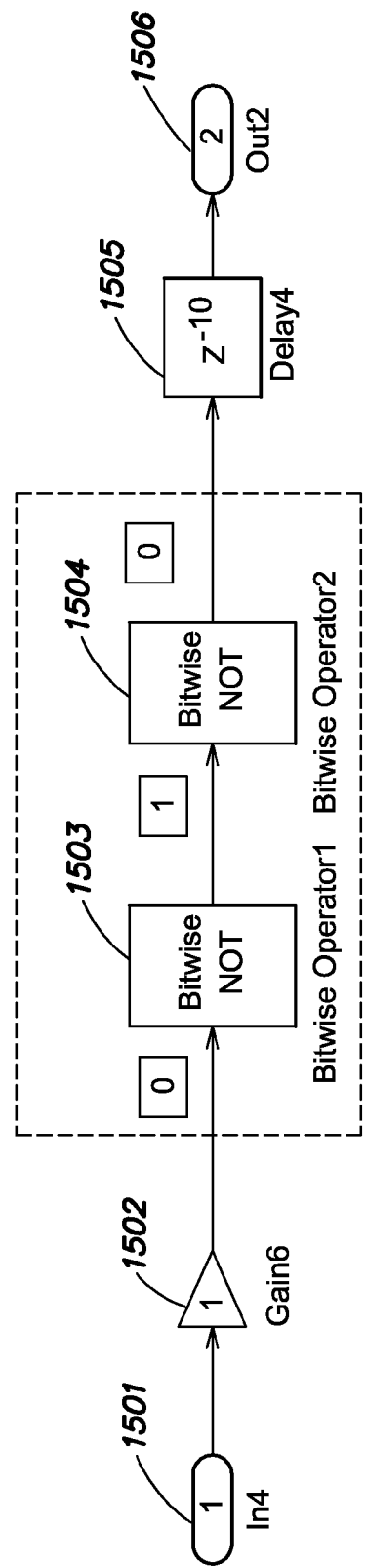
FIG. 15 is an example of a user-applied change to a component model.

In another example illustrated in FIG. 15, a pair of bitwise NOT operators 1503, 1504 have been grouped to ensure the f(0)=0 condition is met. In this case, it may be possible for the user to redesign the subsystem after seeing that the subsystem has failed to pass the FE compliance test.

In one such redesign, the user may determine that an offending subsystem that does not pass the FE compliance test should be submitted to retiming anyway. This may be desirable when overriding design considerations indicate FE is not as important for a particular subsystem as other benefits to be obtained by retiming.

One implementation of an FE retiming algorithm thus has two phases: (1) partition the PIR to identify retiming-safe sub-graphs; (2) apply the traditional retiming algorithm on these sub-graphs. The following algorithm finds all retiming sub-graphs in PIR=(V,E) with a time complexity of O(|V|+|E|):

```
function Partition(PIR = (V,E))
Mark every node in V not visited
while not all node in V is visited do
    Find a node sv in V that has not been visited
    Create an empty node set Vrt
    Relax(sv,Vrt)
    if Vrt is not empty then
        With Vrt , create a sub-graph Grt =< Vrt , Ert >, where Ert
            contains all edges in E that connect nodes in V_rt
    end if
end while
end function
function Relax(sv,Vrt )
if sv has not been visited then
    Mark sv visited
    if sv satisfies condition (1) and (2) from Theorem 1 then
        add sv to Vrt
        for every neighboring node (can be either upstream or
            downstream) nv of sv do
            Relax(nv,Vrt)
        end for
    end if
end if
end function
```

In the second phase, traditional retiming can be applied on all retiming-safe sub-graphs found in the first phase.

The FE retiming algorithm has several advantages: (a) it is fast, (b) the expensive retiming phase is performed on smaller sub-graphs, and (c) it does not need to compute equivalent initial state, (d) it does not require additional logic to compute initial state, and (e) it is capable of handling complex nodes. Since the PR has a finite set of node-types, retiming-safety may be defined for each node type thus making it easier to define retiming-safety for the graph. For user-defined functions, e.g., using MATLAB functions or Stateflow charts, constant-propagation may be used to check if the retiming-safety conditions are met.

IV. Example Model and Retimed Model

Figure 16:
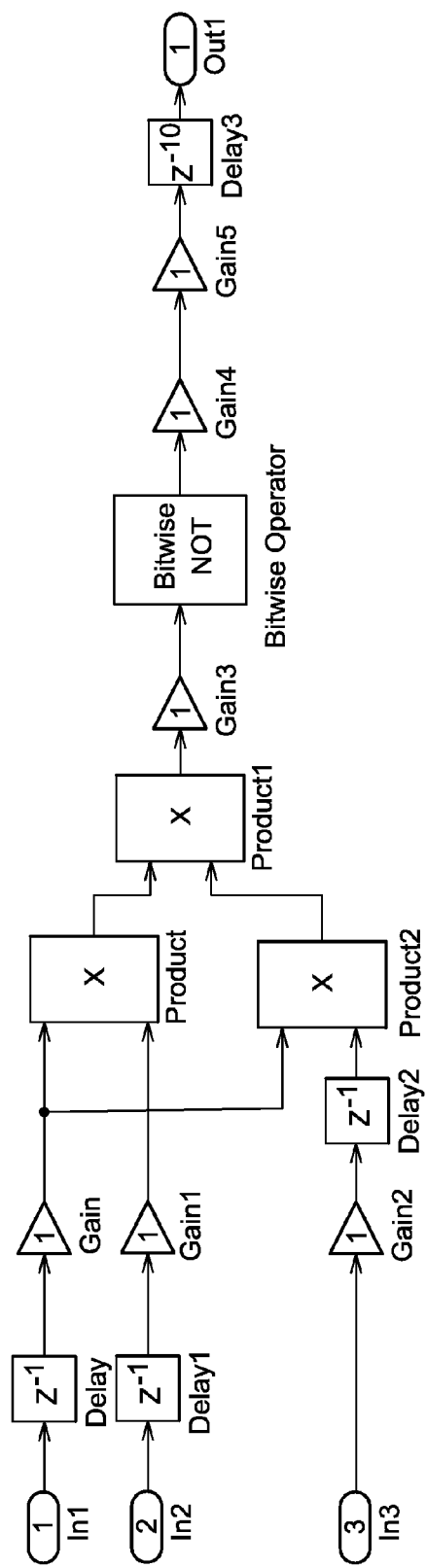
FIGS. 16-18 illustrate example models.
Figure 17:
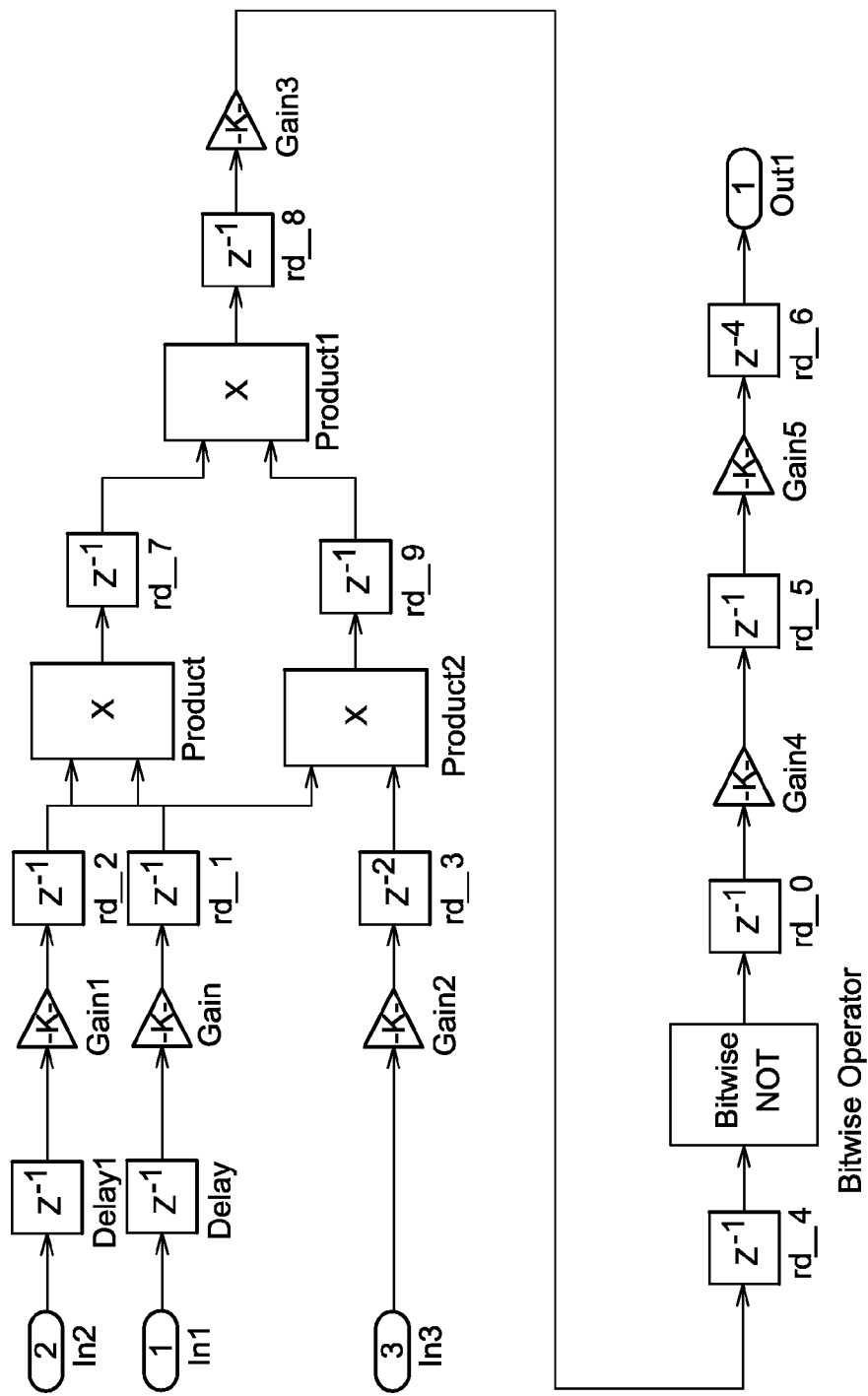

FIG. 16 is an example initial graph for a subsystem that implements part of a digital signal processing function. FIG.

Figure 18:
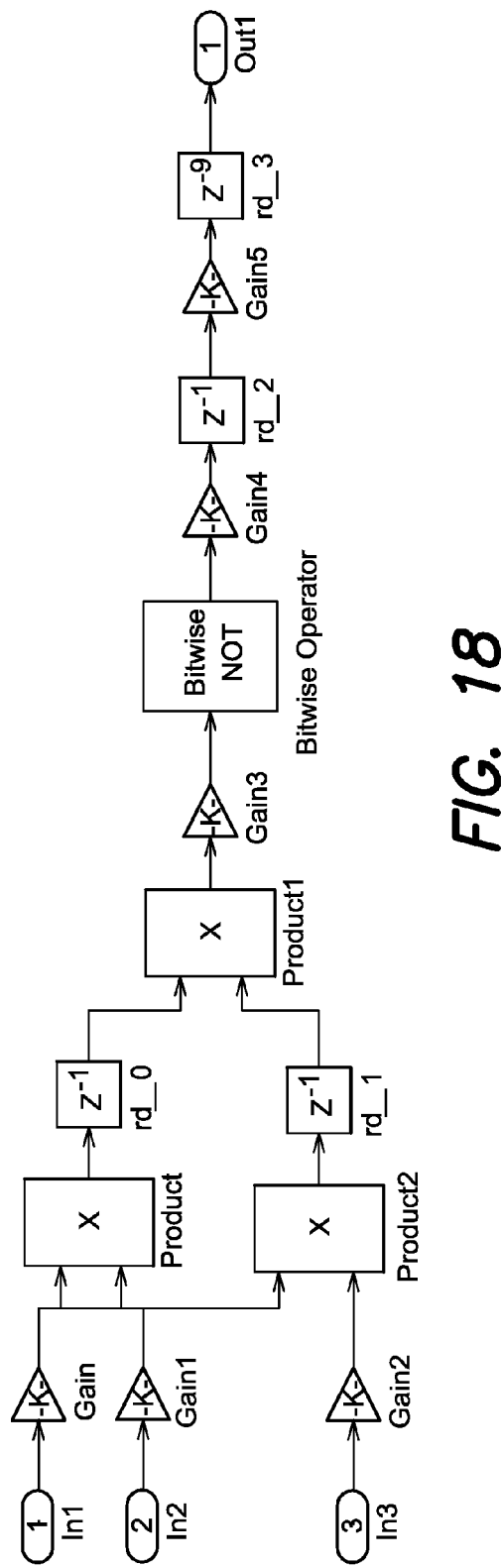

17 is the initial graph retimed without first applying the FE constraints described above. FIG. 18 is the retimed graph but with FE constraints applied before the retiming. Note that when FE constraints are first applied, the resulting model is not only simpler but also includes fewer delays.

V. Further Considerations

As described herein, embodiments of the system and method can apply functional equivalence as a primary constraint in implementing a high-level design specification. In some embodiments, only if these functional equivalence constraints are met are further optimizations, such as retiming, applied.

While what has been described as an example is a way to generate an HDL description to be implemented in hardware such as a field programmable gate array or application specific integrated circuit, it should be understood that the same techniques can be used to generate other things, such as program code (such as C code) to be executed on a programmable processor, from a high level description.

Alternative embodiments may use various techniques to split a program for is execution on multi-core processors or to create a multi-threaded process or program from a single-threaded process or program.

The foregoing description has been directed to example embodiments. It will be apparent, however, that other variations and modifications may be made to the described embodiments, with the attainment of some or all of their advantages. Therefore, it is the object of the appended claims to cover all such variations and modifications as come within the true spirit and scope of this patent.

What is claimed is:

1. A method comprising:
building, on a computer, at least one intermediate representation (IR) including a specification for two or more components and a plurality of interconnections between the two or more components;
storing the at least one IR in a memory;
analyzing, on the computer, a first component and a second component of the at least one IR, the first and second components connected to one another, and the analyzing comprising
determining a first condition in which the first component passes a functional equivalence retiming test;
determining a second condition in which the second component fails a functional equivalence retiming test;
when the first and second conditions are determined to exist, then
using the connection between the first and second component as a boundary for partitioning the at least one IR into a first partitioned portion that includes the first component that passes the functional equivalence retiming test and a second partitioned portion that includes the second component that fails the functional equivalence retiming test; and
rearranging, on the computer, at least one or more of the components in the first partitioned portion of the at least one IR, to obtain a retimed IR, the retimed IR having a retimed execution order that has functional equivalence with the at least one IR.

2. The method of claim 1 additionally comprising:
rearranging, on the computer, at least one or more of the components in the second partitioned portion of the at least one IR.

3. The method of claim 1 wherein the functional equivalence retiming test for a selected one of the first component or the second component further comprises:
given an input value;
determining a first condition of whether the selected component produces an output value that is the same as the given input value; and
determining a second condition of whether the selected component does not change internal state with the given input value.

4. The method of claim 1 wherein the functional equivalence retiming test for a selected one of the first or the second component further comprises:
determining whether the selected component
(a) has a predetermined initial state; or
(b) produces an expected output value given an input value, or
(c) produces no state change for a selected input value; and
if at least two of (a), (b) and (c) are determined to be true, then determining the selected component passes the functional equivalence test.

5. The method of claim 1 wherein the functional equivalence retiming test for a selected one of the first component or the second component further comprises:
determining whether the selected component:
has a zero initial state value; and
produces a zero output value from a zero input value.

6. The method of claim 1 additionally comprising:
retiming an execution order of the first partitioned portion independently from retiming an execution order of the second partitioned portion.

7. The method of claim 1 additionally comprising:
receiving, on the computer, the at least one IR from a code generator.

8. The method of claim 1 further comprising, on the computer, using the retimed IR to generate Hardware Description Language (HDL) code or C code.

9. The method of claim 1 further comprising, on the computer,
determining semantics of the first and second component by executing a model of the component, or by using compiler techniques for constant propagation or conditional constant propagation.

10. The method of claim 1 additionally comprising the step of:
initiating fabrication of a circuit using the retimed IR.

11. The method of claim 1 wherein the retimed IR has reduced combinatorial latency as compared to the at least one IR.

12. An apparatus comprising:
an intermediate representation (IR) receiver, for receiving an IR that comprises a functional model that includes a representation of at least two components and a plurality of interconnections between the components;
a memory, for storing the IR;
a processor, for executing program code for a functional equivalence analyzer, the program code for accessing the memory to read the IR and to determine:
a first condition in which a first component passes a functional equivalence retiming test;
a second condition in which a second component fails a functional equivalence retiming test;
when the first and second conditions are determined to exist, using the connection between the first and second component as a boundary for partitioning the IR into a first partitioned portion that includes the first component that passes the functional equivalence retiming test and a second partitioned portion that includes the second component that fails the functional equivalence retiming test; and rearranging at least one or more of the components in the first partitioned portion of the IR, to obtain a retimed IR, the retimed IR having a retimed execution order that has a functional equivalence with the IR.

13. The apparatus of claim 12 wherein the program code is further for rearranging at least one or more of the components in the first partitioned portion of the IR.

14. The apparatus of claim 12 wherein the program code is further for rearranging at least one or more of the components in the second partitioned portion of the IR.

15. The apparatus of claim 12 wherein the functional equivalence retiming test for a selected one of the first component or the second component further comprises:
given an input value;
determining a first condition of whether the selected component produces an output value that is the same as the given input value; and
determining a second condition of whether the selected component does not change internal state with the given input value.

16. The apparatus of claim 12 wherein the functional equivalence retiming test for a selected one of the first or the second component determines whether the component:
(a) has a predetermined initial state; or
(b) produces an expected output value given an input value, or
(c) produces no state change for a selected input value; and
if at least two of (a), (b) and (c) are determined to be true, then determines the selected component passes the functional equivalence test.

17. The apparatus of claim 12 wherein the functional equivalence retiming test for a selected one of the first component or the second component further determines whether
the selected component:
has a zero initial state value; and
produces a zero output value from a zero input value.

18. The apparatus of claim 12 wherein the program code is further for retiming an execution order of the components within the first partitioned portion of the IR.

19. The apparatus of claim 12 wherein the program code is further for retiming an execution order of the first partitioned portion independently from retiming an execution order of the second partitioned portion.

20. The apparatus of claim 12 wherein the program code is further for receiving the IR from a code generator.

21. The apparatus of claim 12 wherein the program code is further for using the IR to generate Hardware Description Language (HDL) code or C code.

22. The apparatus of claim 12 wherein the program code is further for determining semantics of the first and second component by executing a model of the component, or by using compiler techniques for constant propagation or conditional constant propagation.

23. The apparatus of claim 12 wherein the processor is further for executing program code to fabricate a circuit using the retimed IR.

24. The apparatus of claim 12 wherein the retimed IR has reduced combinatorial latency as compared to the at least one IR.

25. A non-transitory computer readable medium comprising instructions executable by a computer, the medium comprising:
instructions to build one or more intermediate representations (IRs) of a functional specification, at least one IR including a plurality components and a plurality of interconnections between the components;
instructions to store the at least one IR in a memory;
instructions to analyze the at least one IR to determine if conditions for at least one component therein include:
(a) a first condition in which a first component passes a functional equivalence retiming test;
(b) a second condition in which a second component fails a functional equivalence retiming test; and
instructions to rearrange at least one connection or the at least one component in the IR, if conditions (a) and (b) are determined to exist for the component, to obtain a retimed IR, the retimed IR having a retimed execution order that has a functional equivalence with the at least one IR.

26. The non-transitory computer readable medium of claim 25, the medium further comprising:
instructions to fabricate a circuit using the retimed IR.

27. The non-transitory computer readable medium of claim 25, wherein the instructions to rearrange at least one connection further produce the retimed IR with reduced combinatorial latency as compared to the at least one IR.

28. The non-transitory computer readable medium of claim 25 wherein the program code is further for rearranging at least one or more of the components in a first partitioned portion of the at least one IR.

29. The non-transitory computer-readable medium of claim 25 wherein the program code is further for rearranging at least one or more of the components in a second partitioned portion of the at least one IR.

30. The non-transitory computer-readable medium of claim 25 wherein program code for the functional equivalence retiming test for a selected one of the first component or the second component further comprises program code for:
given an input value;
determining a first condition of whether the selected component produces an output value that is the same as the given input value; and
determining a second condition of whether the selected component does not change internal state with the given input value.

31. The non-transitory computer-readable medium of claim 25 wherein the program code for the functional equivalence retiming test for a selected one of the first or the second component contains program code that determines whether the component:
(a) has a predetermined initial state; or
(b) produces an expected output value given an input value, or
(c) produces no state change for a selected input value; and
if at least two of (a), (b) and (c) are determined to be true, then determines the selected component passes the functional equivalence test.

32. The non-transitory computer-readable medium of claim 25 wherein the program code for the functional equivalence retiming test for a selected one of the first component or the second component further contains program code for determining whether the selected component:
has a zero initial state value; and
produces a zero output value from a zero input value.

33. The non-transitory computer-readable medium of claim 25 wherein the program code is further for retiming an execution order of the components within a first partitioned portion of the IR.

34. The non-transitory computer-readable medium of claim 25 wherein the program code is further for retiming an execution order of the a partitioned portion independently from retiming an execution order of a second partitioned portion.

35. The non-transitory computer-readable medium of claim 25 wherein the program code is further for receiving the IR from a code generator.

36. The non-transitory computer-readable medium of claim 25 wherein the program code is further for using the IR to generate Hardware Description Language (HDL) code or C code.

37. The non-transitory computer-readable medium of claim 25 wherein the program code is further for determining semantics of the first and second component by executing a model of the component, or by using compiler techniques for constant propagation or conditional constant propagation.

* * * * *

UNITED STATES PATENT AND TRADEMARK OFFICE
CERTIFICATE OF CORRECTION

PATENT NO. : 9,779,195 B2
APPLICATION NO. : 14/640239
DATED : October 3, 2017
INVENTOR(S) : Yongfeng Gu et al.

Page 1 of 2

It is certified that error appears in the above-identified patent and that said Letters Patent is hereby corrected as shown below:

In the Specification

Column 4, Line 38 reads:
"ment system from AccuS oft Corp. of Northborough, Mass.,"
Should read:
--ment system from AccuSoft Corp. of Northborough, Mass.,--

Column 10, Line 36 reads:
"registers, conditions may be is defined under which the"
Should read:
--registers, conditions may be defined under which the--

Column 11, Line 10 reads:
"retiming-safe in m. is Based on this, a retiming-sage sub-"
Should read:
--retiming-safe in m. Based on this, a retiming-sage sub- --

Column 11, Line 48 reads:
"lence (FE) analysis 255 to partition a design into is groups"
Should read:
--lence (FE) analysis 255 to partition a design into groups--

Column 12, Line 59 reads:
"complex nodes. Since the PR has a finite set of node-types,"
Should read:
--complex nodes. Since the PIR has a finite set of node-types,--

Column 13, Line 21 reads:
"split a program for is execution on multi-core processors or"

Signed and Sealed this
Third Day of September, 2019

Andrei Iancu
*Director of the United States Patent and Trademark Office*

Should read:

--split a program for execution on multi-core processors or--